(12) United States Patent
Ohta (10) Patent No.: US 7,811,169 B2
(45) Date of Patent: Oct. 12, 2010

(54) GAME PROGRAM

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1623 days.

(21) Appl. No.: 11/068,392

(22) Filed: Mar. 1, 2005

(65) Prior Publication Data

US 2005/0197186 A1 Sep. 8, 2005

(30) Foreign Application Priority Data

Mar. 5, 2004 (JP) .............................. 2004-062771

(51) Int. Cl.
*A63F 13/00* (2006.01)

(52) U.S. Cl. ...................................... 463/30; 715/769

(58) Field of Classification Search .................... 463/30
See application file for complete search history.

(56) References Cited

U.S. PATENT DOCUMENTS

| 4,812,828 | A  | 3/1989  | Nishi et al.     |
| 5,327,161 | A  | 7/1994  | Logan et al.     |
| 5,498,003 | A  | 3/1996  | Gechter          |
| 5,757,368 | A  | 5/1998  | Gerpheide et al. |
| 6,252,563 | B1 | 6/2001  | Tada et al.      |
| 6,292,179 | B1 | 9/2001  | Lee              |
| 6,545,669 | B1 | 4/2003  | Kinawi et al.    |
| 6,803,905 | B1 | 10/2004 | Capps et al.     |
| 6,822,635 | B2 | 11/2004 | Shahoian et al.  |
| 6,940,494 | B2 | 9/2005  | Hoshino et al. ............. 345/173 |
| 7,245,293 | B2 | 7/2007  | Hoshino et al. ............. 345/173 |
| 2004/0021643 | A1* | 2/2004 | Hoshino et al. ............. 345/173 |
| 2005/0052430 | A1 | 3/2005 | Shahoian et al. |

FOREIGN PATENT DOCUMENTS

| JP | 3289072      | 3/2002 |
| JP | 2002-136768  | 5/2002 |
| JP | 2004-70492   | 3/2004 |

OTHER PUBLICATIONS

Japanese Official Action issued in connection with corresponding Japanese Patent Application No. 2004-062771, dated Jul. 7, 2008.

* cited by examiner

*Primary Examiner*—Dmitry Suhol
*Assistant Examiner*—Thomas H Henry
(74) *Attorney, Agent, or Firm*—Nixon & Vanderhye P.C.

(57) ABSTRACT

An object (OB1) displayed on a second display screen (12a) is allowed to move according to input coordinates on a touch panel. When a control target object collides with an obstacle, the control target object is allowed to stop immediately before the obstacle. Thereafter, when the distance between the display coordinates of the control target object and the current input coordinates is greater than or equal to a predetermined value, a straight line connecting the control target object and the finger is displayed on the second display screen (12a). By this, in a game in which an object displayed on a display screen is moved by a player sliding his/her finger across a touch panel, even if the finger has unexpectedly deviated from the object during the course of the game, the player does not feel a sense of uncertainty.

27 Claims, 11 Drawing Sheets

GAME PROGRAM

This application claims the benefit of JP 2004-062771, filed on Mar. 5, 2004, the entire contents of which are hereby incorporated herein by reference.

BACKGROUND OF THE INVENTION

1. Field of the Invention

The present invention relates to a game program, and in particular to a game program which allows the display position of an object displayed on a display screen to change in accordance with a change of coordinates inputted through a touch panel which is provided on the display screen.

2. Description of the Background Art

Among conventional video game machines, there exists a video game machine in which a touch panel is provided on a display screen, and the display position of a piece in a game of shogi (Japanese chess) displayed on the display screen is allowed to change in accordance with the movement of the finger on the touch panel (Japanese Patent No. 3289072). Such a video game machine allows a player to change the display position of a shogi piece displayed on the display screen as if he/she were actually moving the shogi piece with his/her finger.

In the real-world case where the movement of a real object by the finger of a person is hindered by the friction between the object and its contact surface, or by a collision with an obstacle such as a wall, the person can perceive it through the sense of touch at the fingertip.

Figure 11A:
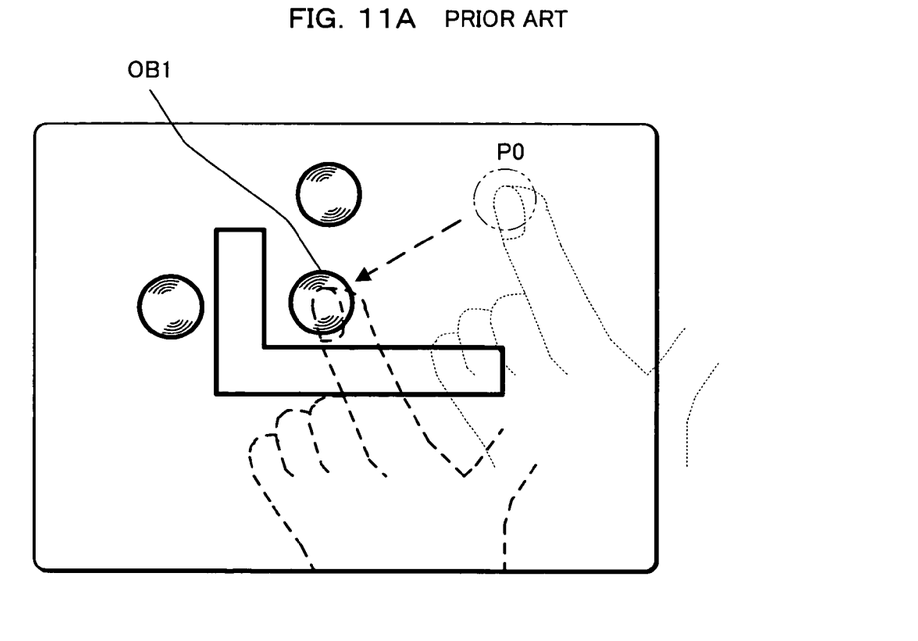
FIG. 11A is an exemplary conventional game image.
Figure 11B:
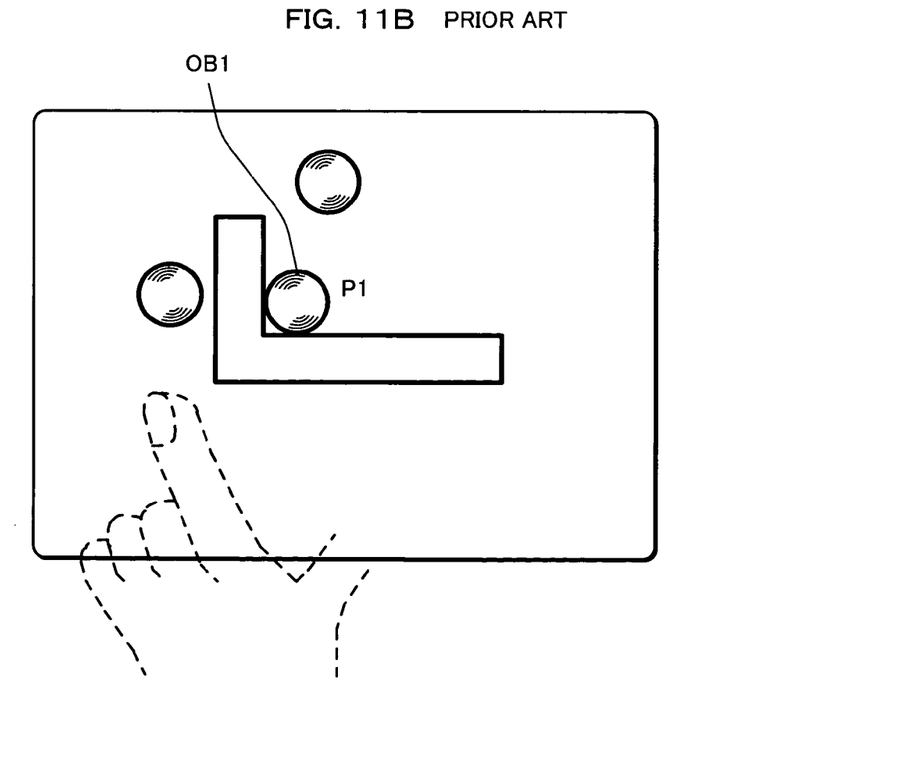
FIG. 11B is another exemplary conventional game image.

On the other hand, in a video game machine, in the case where an object displayed on a display screen provided under a touch panel is moved by the finger of a player, even if the object is hindered from moving by a collision with an obstacle in virtual space, the player cannot perceive it through the sense of touch because the feel the player has is only the feel of sliding the finger across the touch panel. Note, however, that in this case too, the player can perceive a collision of the object with the obstacle in the virtual space through the sense of sight. For example, as shown in FIG. 11A, when the player attempts to move an object OB1 displayed at a position P0 toward the lower left of the screen, if the object OB1 stops at a position P1 shown in FIG. 11B, the player can recognize that the movement of the object OB1 is hindered by an L-shaped obstacle displayed on the screen, from the fact that the player's finger deviates from the object OB1 as shown in FIG. 11B.

Depending on the type of game, a factor (e.g., an object or physical properties) which hinders the movement of the object may not be displayed on the screen. For example, there may be a game that a player leads an object to a goal while avoiding a transparent, invisible obstacle. As another example, there may be a game that a virtual ground having an object placed thereon has different frictional forces at different points and when a player attempts to move the object over a point having a high frictional force, the object stops. As such, in some types of games, it is important to create sensations of unexpectedness that a moving object does not move according to the player's wishes, by intentionally not displaying a factor which hinders the movement of the object.

Figure 12A:
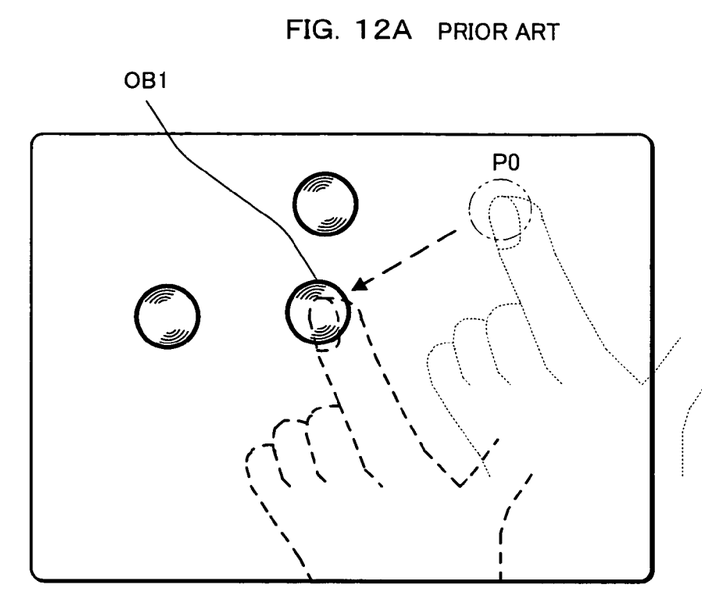
FIG. 12A is still another exemplary conventional game image.
Figure 12B:
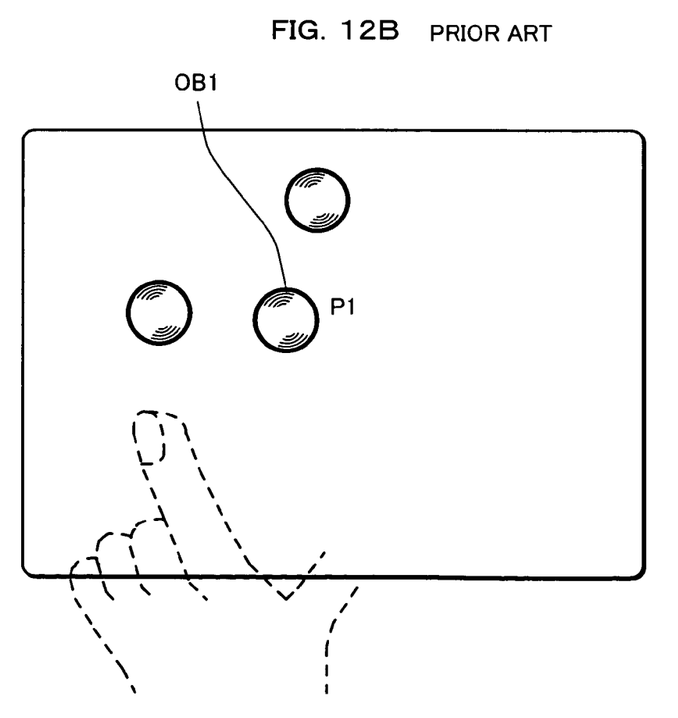
FIG. 12B is yet another exemplary conventional game image.

However, in the case where the factor hindering the movement of the object is not displayed on the screen, since the player's finger unexpectedly deviates from the object, the player may feel a sense of uncertainty. For example, suppose that, as shown in FIG. 12A, when the player moves an object OB1 from a position P0 toward the lower left of the screen, if the object OB1 is hindered from moving at a position P1 shown in FIG. 12B by an obstacle not being appeared on the screen or by friction, the player may consider the possibility that:

the touch panel may be partially broken down;
computer processing speed may not be fast enough to catch up with the moving speed of the finger;
a touch applied to the touch panel at the position P1 may have been weak, or the finger may have been lifted from the touch panel; or
there may be an invisible obstacle or friction.

However, since what caused the finger to deviate from the object cannot be identified from the display screen shown in FIG. 12B, the player cannot help having a sense of uncertainty about whether the deviation was intended by the game. Under these circumstances, even if the game succeeds to create sensations of unexpectedness, the game cannot meet the player's satisfaction.

In some cases, the player may feel a sense of uncertainty, even in the case of FIG. 11B. For example, the player may mistake the L-shaped obstacle shown in FIG. 11B for just a pattern drawn on the ground, and thus the player may think that the object OB1 has stopped due to touch panel failure or misoperation.

SUMMARY OF THE INVENTION

Therefore, an object of the present invention is to realize a game in which an object displayed on a display screen is moved by a player sliding his/her finger (or a stylus) across a touch panel, which allows the player to recognize the event that the finger has unexpectedly deviated from the object during the course of the game, as being intended by the game.

The present invention has the following features to attain the object mentioned above. It is to be understood that drawing numbers and reference numerals in parentheses are provided for illustrating the corresponding relationships with drawings to assist in the understanding of the present invention and thus are not intended to limit the scope of the present invention.

A first aspect of the illustration embodiment is directed to a computer-readable storage medium having stored therein a game program which allows a computer being electrically connected to a display screen (12a) for displaying a game image and a touch panel (13) covering the display screen, to function as game image display control (S10), input coordinate detector (S20, S30), control-target setter (S25), display-coordinate updater (S38), and display state changer (S53, S14).

The game image display control displays on the display screen a game image including an object image (OB1) movable by a player.

The input coordinate detector detects, at a predetermined interval, input coordinates outputted from the touch panel when an input is applied to the touch panel by the player.

The control-target setter sets, when the input coordinates at an initial stage of detection by the input coordinate detector and display coordinates of the object image on the display screen satisfy a certain relationship, the object image as a control target object of the player while input coordinates are continued to be detected from the touch panel by the input coordinate detector.

The display-coordinate updater sequentially updates the display coordinates of the control target object according to input coordinates sequentially detected by the input coordinate detector.

The display state changer changes, when current input coordinates and the display coordinates of the control target object are spaced apart by a predetermined distance, a display state of the game image so as to indicate that the control target object is set as a control target of the player.

In a second aspect of the illustrative embodiment based on the first aspect, the game program may further allow the computer to function as update stopper (S37) for stopping an update of the display coordinates of the control target object when the display coordinates of the control target object satisfy a predetermined condition.

Figure 3:
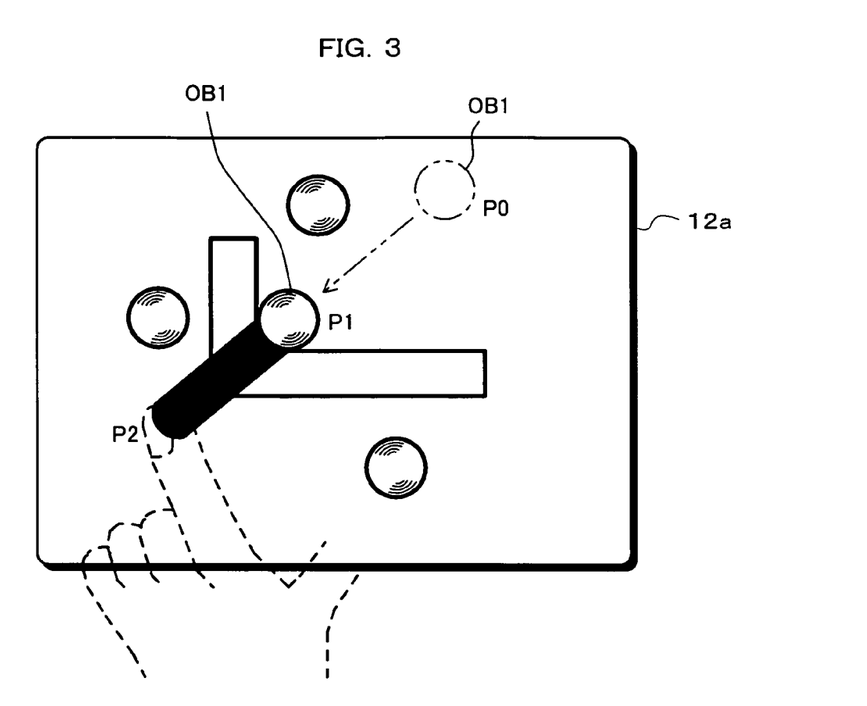
FIG. 3 is an exemplary game image displayed on a second display screen 12*a;*

In a third aspect of the illustrative embodiment based on the first aspect, the display state changer may display a line connecting between a position corresponding to the current input coordinates and the control target object (FIG. 3).

Figure 4:
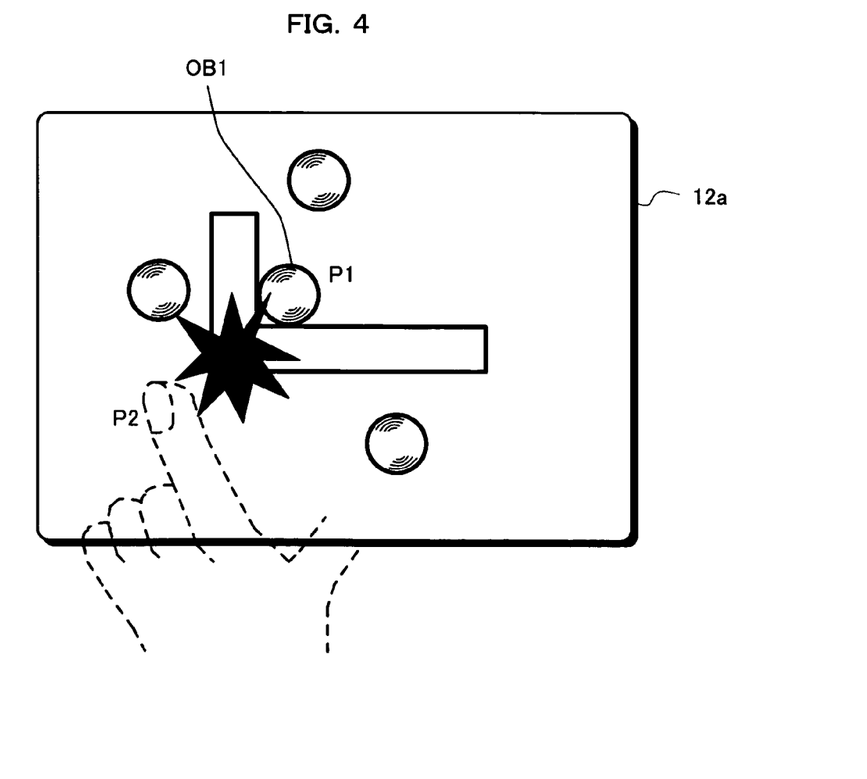
FIG. 4 is another exemplary game image displayed on the second display screen 12*a;*

In a fourth aspect of the illustrative embodiment based on the first aspect, the display state changer may display a predetermined image on a straight line connecting between a position corresponding to the current input coordinates and the control target object (FIG. 4).

Figure 5:
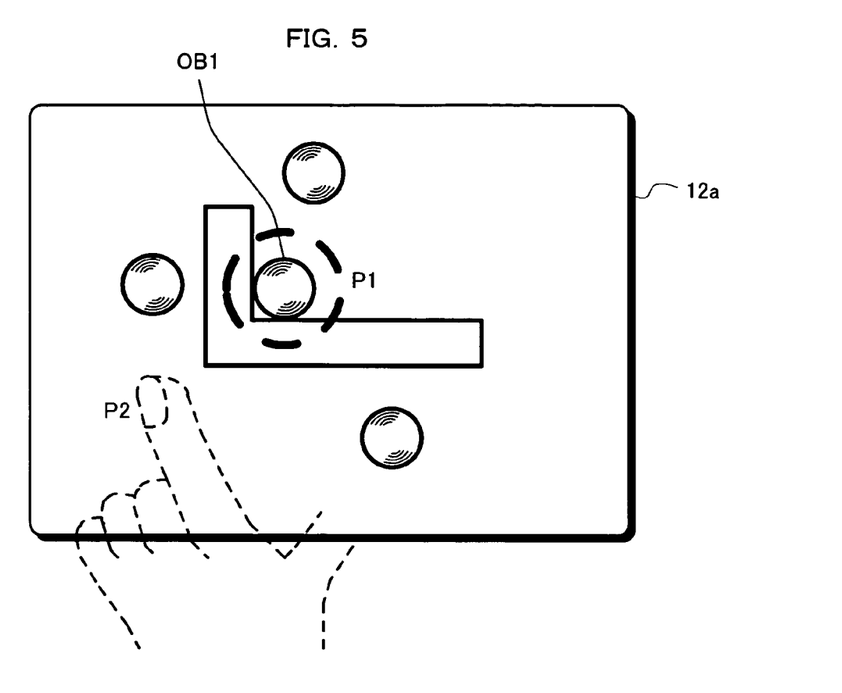
FIG. 5 is still another exemplary game image displayed on the second display screen 12*a;*

In a fifth aspect of the illustrative embodiment based on the first aspect, the display state changer may change a display mode of the control target object (FIG. 5).

Figure 6A:
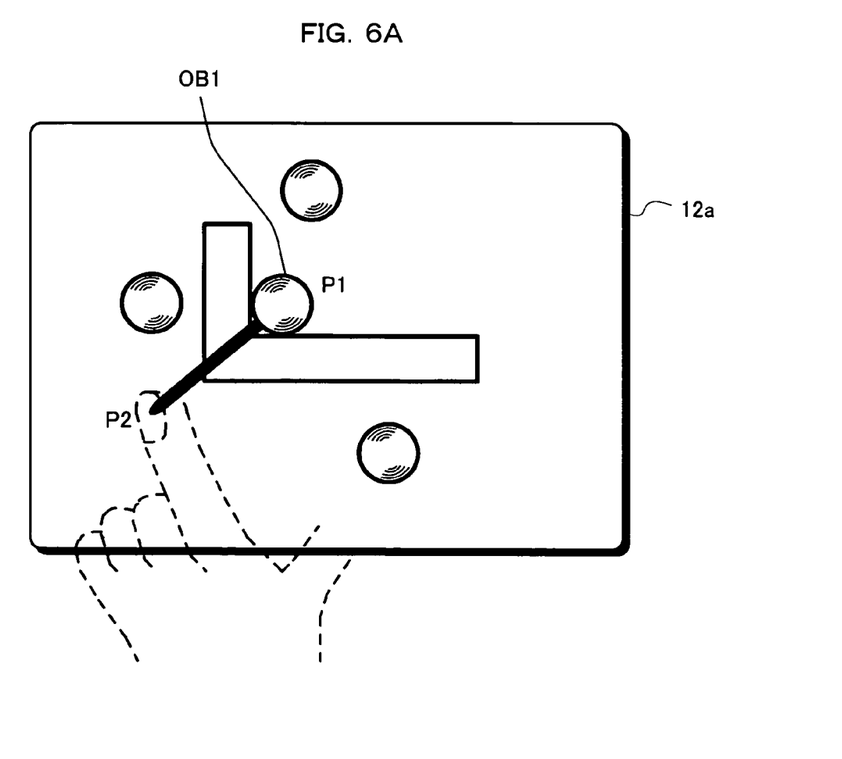
FIG. 6A is another exemplary game image displayed on the second display screen 12*a;*
Figure 6B:
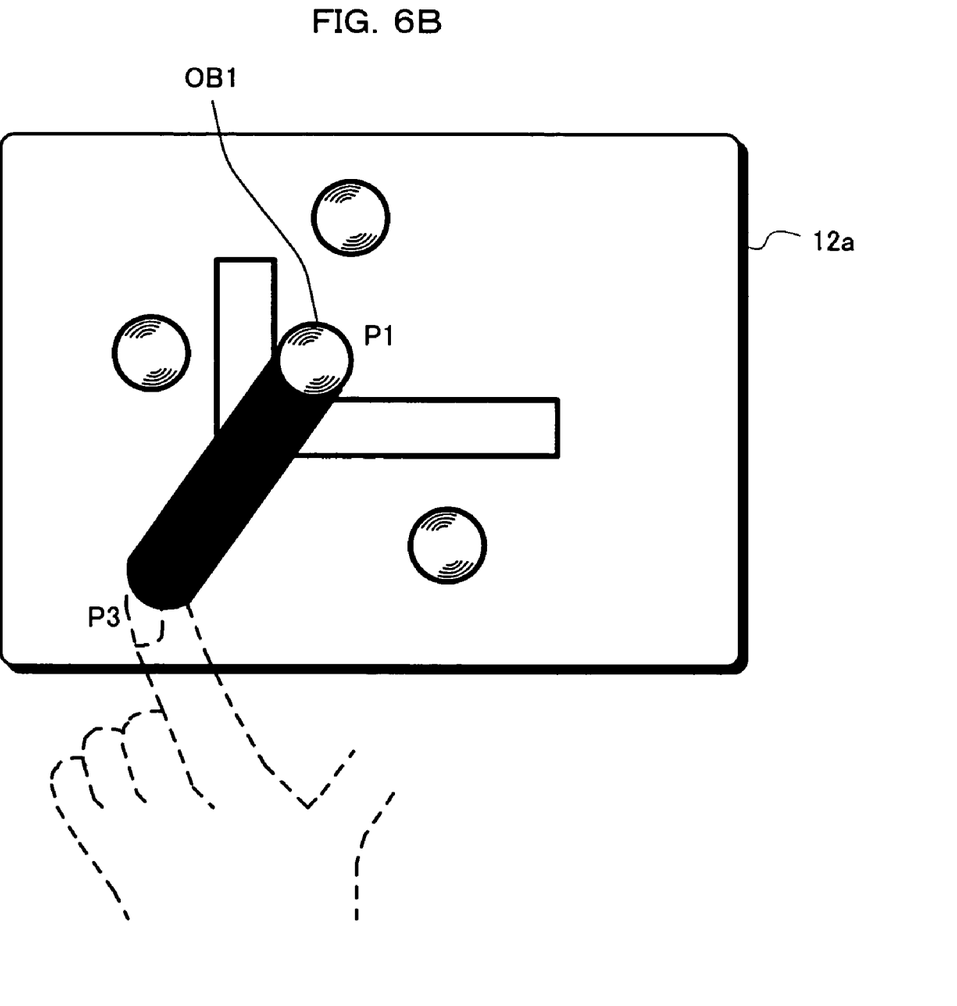
FIG. 6B is yet another exemplary game image displayed on the second display screen 12*a;*

In a sixth aspect of the illustrative embodiment based on the first aspect, the display state changer may change a display state of the game image according to a distance between the current input coordinates and the display coordinates of the control target object (FIGS. 6A and 6B).

According to the first aspect, in the case where, while the player is moving an object (specifically, the object image) with his/her finger (or a stylus), the position of the finger has deviated from the object, if the object is still set as a control target object, a game image indicating such a fact is displayed. Thus, the player can be convinced that what caused the position of the finger to deviate from the control target object was not a result of touch panel failure or misoperation (for example, the finger was removed from the touch panel), but resulted from the game's intention, i.e., resulted from normal processing based on the game program. Accordingly, the player can proceed with the game without having an unnecessary sense of uncertainty. On the other hand, in the case where, even though the position of the finger has deviated from the object, a game image indicating such a fact is not displayed, the player can be convinced that what caused the position of the finger to deviate from the control target object resulted from touch panel failure or misoperation, and thus the player can take appropriate measures against the cause.

According to the second aspect, in the case where the position of the control target object has stopped at a predetermined position, although the player can realize it by the sense of sight, in this case too, since the relationship between the object image and the position where the finger touches is displayed, the player can be convinced that he/she can still move the control target object, and accordingly the player can proceed with the game without having an unnecessary sense of uncertainty.

According to the third aspect, when the position of the finger has deviated from the control target object, a line is displayed on the display screen. Therefore, the player is made aware that the control target object has stopped as the result of normal processing based on the game program. In addition, since the line is displayed so as to be coupled with the control target object, the player can very easily identify the control target object distanced from the position of the finger.

According to the fourth aspect, when the position of the finger has deviated from the control target object, a predetermined image is displayed. Therefore, the player is made aware that the control target object has stopped as the result of normal processing based on the game program. In addition, since the image is displayed on a straight line connecting between the position of the finger and the control target object, the player can easily identify the control target object distanced from the position of the finger.

According to the fifth aspect, when the position of the finger has deviated from the control target object, the display mode of the control target object changes. Therefore, the player is made aware that the control target object has stopped as the result of normal processing based on the game program, and in addition, the player can very easily identify the control target object distanced from the position of the finger.

According to the sixth aspect, for example, by displaying a line connecting between the control target object and the finger such that the line gets thicker as the distance between the control target object and the finger increases, when the position of the finger does not deviate from the control target object so much, a visual change in a game image caused by displaying a straight line is minimized, and when the position of the finger greatly deviates from the control target object, a distinct line is displayed to make the player aware of it. Conversely, by displaying a line connecting between the control target object and the finger such that the line gets thinner as the distance between the control target object and the finger increases, it is possible to provide an interesting display which looks as if the control target object and the finger were connected by a thick rubber and the rubber were stretching.

These and other objects, features, aspects and advantages of the present invention will become more apparent from the following detailed description of the illustrative embodiment when taken in conjunction with the accompanying drawings.

DESCRIPTION OF THE PREFERRED EMBODIMENTS

A portable game machine 1 will be described below having installed thereon a computer which executes a game program according to an embodiment of the present invention. Note that the description is made using a portable game machine which physically has two display screens, one of which is covered with a touch panel, as an example of the game machine according to the present invention. Note, however, that in the present embodiment a game image should be displayed on at least the display screen covered with the touch panel. It is also possible to use, as the game machine, a stationary video game machine, an arcade game machine, a portable terminal, a mobile phone, a personal computer, or the like.

Figure 1:
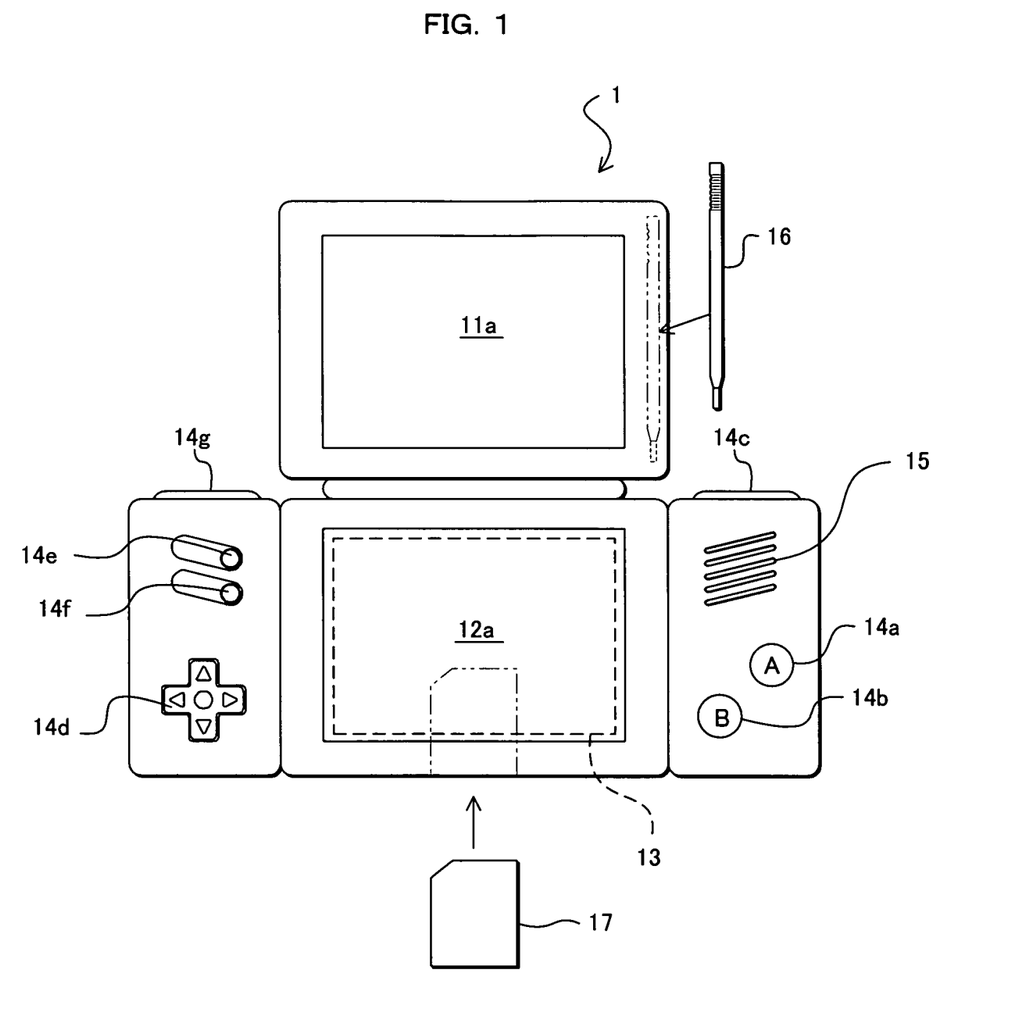
FIG. 1 is an external view illustrating a portable game machine 1.

FIG. 1 is an external view illustrating a portable game machine 1. As shown in FIG. 1, the portable game machine 1 (hereinafter simply referred to as the "game machine 1") has two display screens, i.e., a first display screen 11a and a second display screen 12a. A surface of the second display screen 12a is covered with a touch panel 13. On the right side of the second display screen 12a there are provided an A button 14a, a B button 14b, and an R switch 14c which can be operated by the right hand of a player and a speaker 15 for outputting game music. On the left side of the second display screen 12a there are provided a cross key 14d, a start button 14e, a select button 14f, and an L switch 14g which can be operated by the left hand of the player. In addition, the game machine 1 includes a stylus 16 for making an input to the touch panel 13. The stylus 16 is removably mounted on the game machine 1. Further, a memory card 17 which is a storage medium having stored therein a game program of the present invention cam be removably inserted into the game machine 1. Note that if the touch panel 13 has a high resolution, the use of the stylus 16 is effective, however, if the touch panel 13 has a low resolution, it is not necessary to use the stylus 16 and an input may be made by the finger of the player, for example. The touch panel 13 may be of any type, for example, a resistance film type, an optical type, an ultrasonic type, a capacitance type, or an electromagnetic induction type; however, the resistance film type is particularly favorable in terms of cost. For a position detection method, a matrix method (digital) or a resistance value detection method (analog) can be used depending on the configuration.

Figure 2:
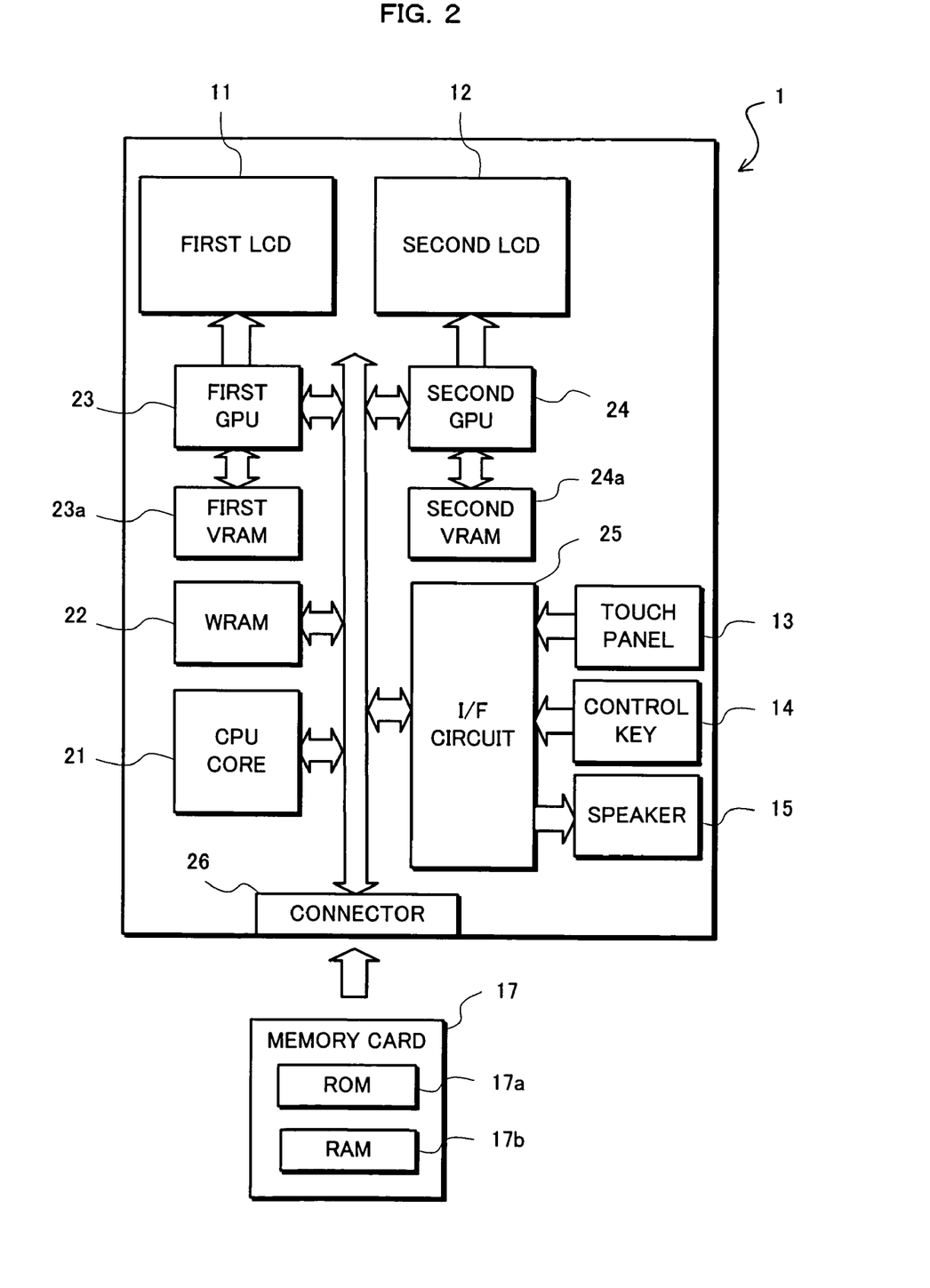
FIG. 2 is a block diagram of the game machine 1.

FIG. 2 is a block diagram of the game machine 1. As shown in FIG. 2, the game machine 1 includes, for example, a CPU core 21 which is an exemplary computer for executing a game program. A WRAM (work random access memory) 22, a first GPU (Graphics Processing Unit) 23, a second GPU 24, and an I/F (interface) circuit 25 are electrically connected to the CPU (Central Processing Unit) 21 via a bus. The WRAM 22 is a memory for temporarily storing a game program to be executed by the CPU core 21, calculation results obtained by the CPU core 21, and the like. The first GPU 23 renders a game image to be displayed on a screen of a first LCD (liquid crystal display) 11 in a first VRAM 23a based on an instruction from the CPU core 21, and then allows the first display screen 11a of the first LCD 11 to display the rendered game image. The second GPU renders a game image to be displayed on a screen of a second LCD 12 in a second VRAM 24a based on an instruction from the CPU core 21, and then allows the second display screen 12a to display the rendered game image. The I/F circuit 25 passes data between external input/output devices, such as a touch panel 13, a control key 14, and a speaker 15, and the CPU core 21. The touch panel 13 (including a device driver for the touch panel) has a coordinate system corresponding to the coordinate system of the second VRAM 24a. The touch panel 13 outputs coordinate data corresponding to a position inputted (specified) by the stylus 16. Note that the resolutions of the display screen and the touch panel 13 can be any value.

Further, a connector 26 is electrically connected to the CPU core 21. A memory card 17 can be inserted into the connector 26. The memory card 17 is a storage medium for storing a game program; specifically, the memory card 17 contains a ROM 17a for storing a game program and a RAM 17b for rewritably storing backup data. The game program stored in the ROM 17a of the memory card 17 is loaded into the WRAM 22. The game program loaded into the WRAM 22 is executed by the CPU core 21. Note that although the present illustrative embodiment describes an example where a game program is provided to the game machine 1 from an external storage medium, a game program may be pre-stored in a non-volatile memory contained within the game machine 1 or may be provided to the game machine 1 via a wired/wireless communication line.

FIG. 3 is an exemplary screen of a game image displayed on the second display screen 12a by the game program according to the present illustrative embodiment. FIG. 3 is an exemplary screen for the case where a player attempts to move an object OB1 from a position PO to a position P2 by the finger. The object OB1 moves from the position PO according to the movement of the finger and stops when coming into contact with an L-shaped obstacle displayed on the second display screen 12a, i.e., when reaching a position P1. The finger, on the other hand, moves to the position P2 without regard to the object OB1 having stopped. As such, in the case where the finger has deviated from the object OB1 as the result of normal processing based on the game program, in the present illustrative embodiment, as shown in FIG. 3, a straight line connecting the finger (at P2) and the object OB1 (at P1) is displayed on the second display screen 12a. By seeing the straight line displayed, the player can be convinced that the object OB1 has stopped as the result of normal processing based on the game program.

Note that a dotted line or a broken line may be displayed instead of a straight line such as that shown in FIG. 3. Alternatively, as shown in FIG. 4, a predetermined image may be displayed on the straight line connecting between the finger and the object OB1. Alternatively, as shown in FIG. 5, the display state of the object OB1 may be changed. Although, in an example of FIG. 5, a circle enclosing the object OB1 is displayed, it is also possible to change the color of the object OB1 or to allow the object OB1 to blink.

Alternatively, such displays may be changed according to the distance between the finger and the object OB1. For example, when the position (P2) of the finger is comparatively close to the position (P1) of the object OB1, as shown in FIG. 6A, a thinner straight line may be displayed, and when the position (P3) of the finger is comparatively far from the position (P1) of the object OB1, as shown in FIG. 6B, a thicker straight line may be displayed. By doing so, when the finger does not deviate from the object OB1 so much, a visual change in a game image caused by displaying a straight line is minimized, and when the finger greatly deviates from the object OB1, a distinct line is displayed to make the player aware of it. Conversely, by displaying a line connecting between a control target object and the finger such that the line gets thinner as the distance between the control target object and the finger increases, it is possible to provide an interesting display which looks as if the control target object and the finger were connected by a thick rubber and the rubber were stretching.

The color of the straight line connecting between the finger and the object OB1 may be changed according to the color of the object OB1 or the distance between the finger and the object OB1.

In addition to displaying a straight line, sound may be outputted or the game machine 1 may be vibrated.

The flow of game processing to be executed based on the game program according to the present illustrative embodiment will be described below with reference to the flowcharts of FIGS. 7 to 10.

First, the CPU core 21 displays four objects and an L-shaped obstacle such as those shown in FIG. 3 on the second display screen 12a (S10). Then, the CPU core 21 determines whether a control target object is set (S11). The control target object is an object being moved by the finger of a player. The player can move a desired object among the objects displayed on the second display screen 12a by touching the desired object with the finger and sliding the desired object in a desired direction on the touch panel 13. Note that the association between the finger and the desired object is lost when the player removes his/her finger from the touch panel 13. The WRAM 22 stores information as to which object is set as the control target object. Thus, the CPU core 21 determines whether the control target object is set by referring to the WRAM 22. If the control target object is not set, the CPU core 21 proceeds to step S12. If the control target object is set, the CPU core 21 proceeds to step S13.

In step S12, a control-target setting process is performed. The control-target setting process will be described in detail below with reference to FIG. 8.

Figure 7:
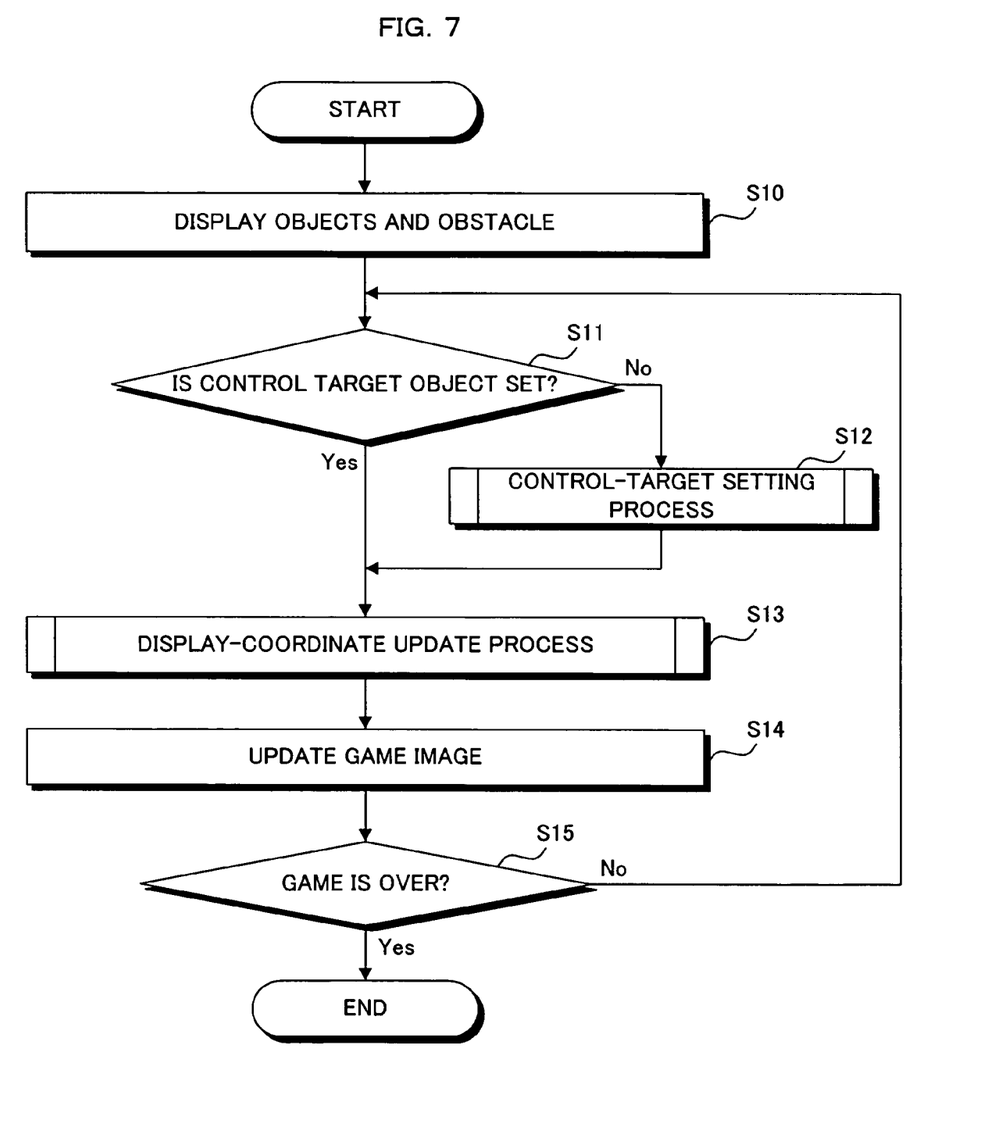
FIG. 7 is a flowchart showing the entire game processing flow.
Figure 8:
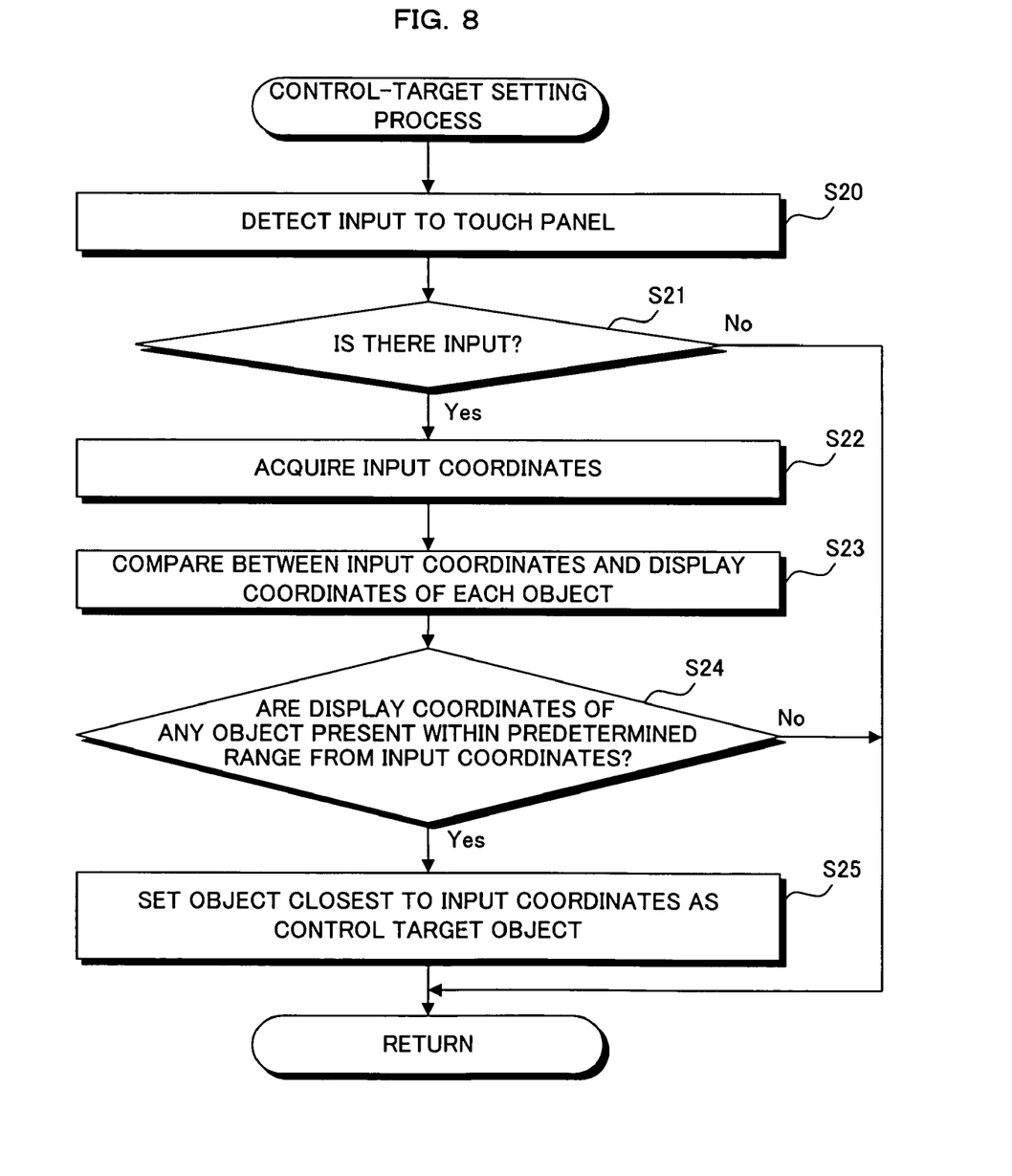
FIG. 8 is a flowchart showing the flow of a control-target setting process.

In FIG. 8, first, the CPU core 21 detects an input to the touch panel 13 (S20) and determines whether there is an input, i.e., whether the finger or the stylus 16 is in contact with the touch panel 13 (S21). If there is no input to the touch panel 13, the CPU core 21 ends the control-target setting process and proceeds to step S13 in FIG. 7.

If there is an input to the touch panel 13, the CPU core 21 acquires coordinate data outputted from the touch panel 13, as input coordinates (S22). The CPU core 21 then compares the input coordinates with the display coordinates of each object (S23). Note that the display coordinates of each object are stored in the WRAM 22. Subsequently, the CPU core 21 determines whether the display coordinates of any of the objects are present within a predetermined range from the input coordinates (S24). If not, the CPU core 21 ends the control-target setting process and proceeds to step S13 in FIG. 7. On the other hand, if the display coordinates of any of the objects are present within the predetermined range from the input coordinates (i.e., if any of the objects is displayed in the vicinity of the position where the finger touches), the CPU core 21 sets an object closest to the input coordinates as the control target object (S25). The CPU core 21 then ends the control-target setting process and proceeds to step S13 in FIG. 7.

In FIG. 7, the CPU core 21 performs a display-coordinate update process in step S13. The display-coordinate update process is a process for allowing the control target object to move according to the movement of the finger, and also a process for displaying a straight line connecting between the finger and the control target object when the finger has deviated from the control target object. The display-coordinate update process will be described in detail below with reference to FIG. 9.

Figure 9:
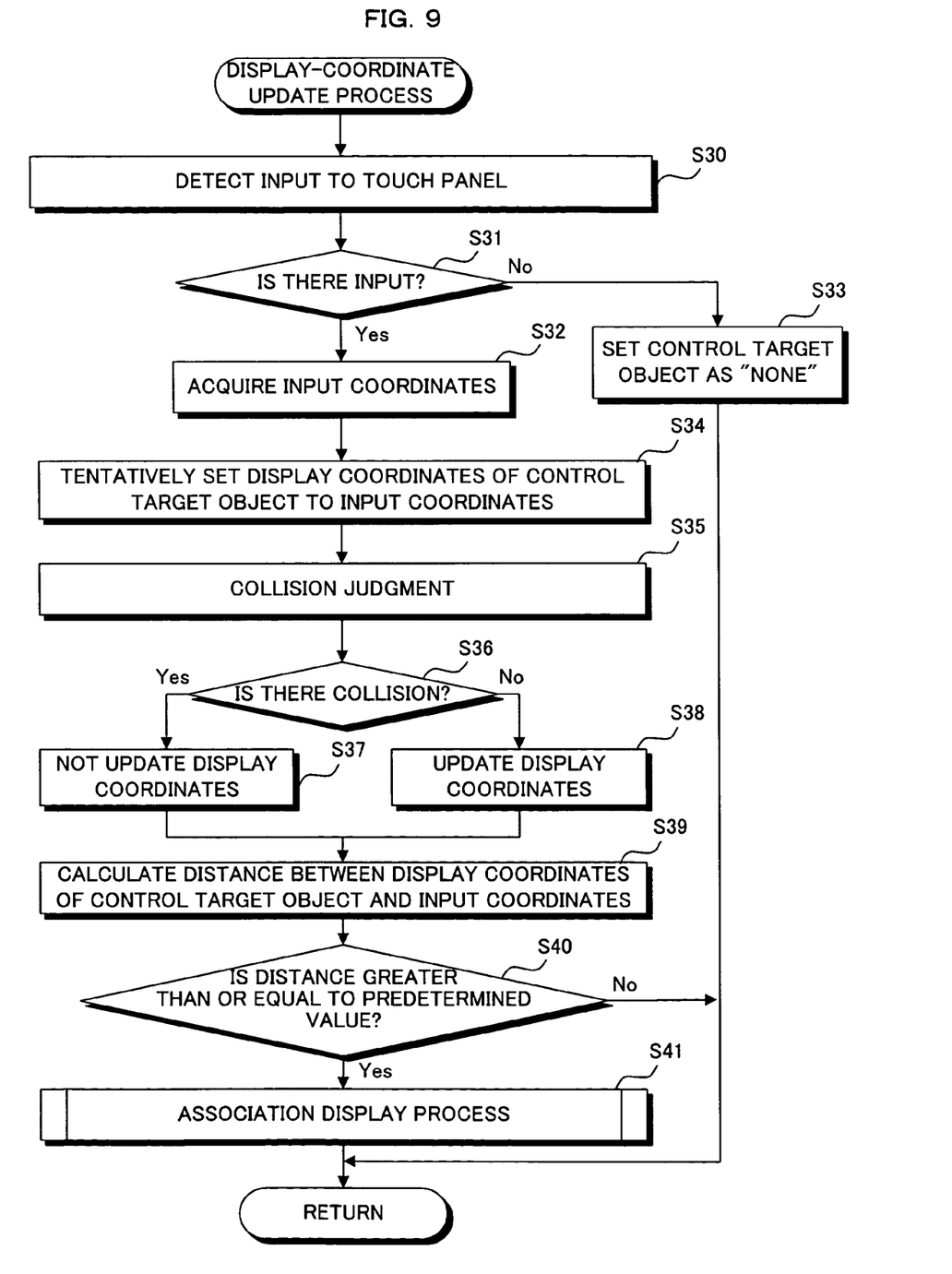
FIG. 9 is a flowchart showing the flow of a display-coordinate update process.

In FIG. 9, the CPU core 21 detects an input to the touch panel 13 (S30) and determines whether there is an input (S31). If there is no input to the touch panel 13, the CPU core 21 determines that the player's finger is removed from the touch panel 13, and thus sets the control target object as "none" (S33). The CPU core 21 then ends the display-coordinate update process and proceeds to step S14 in FIG. 7.

If there is an input to the touch panel 13, the CPU core 21 acquires coordinate data outputted from the touch panel 13, as input coordinates (S32). The input coordinates are temporarily stored in the WRAM 22. The CPU core 21 then tentatively sets the display coordinates of the control target object to the input coordinates (S34). Subsequently, the CPU core 21 judges whether the control target object collides with the obstacle based on the tentatively set display coordinates of the control target object (S35). If the control target object does not collide with the obstacle (i.e., "No" in step S36), the CPU core 21 updates the display coordinates of the control target object with the input coordinates (S38). On the other hand, if the control target object collides with the obstacle (i.e., "Yes" in step S36), the CPU core 21 does not update the display coordinates of the control target object so as to make the control target object stop immediately before the obstacle (i.e., the tentative setting is abandoned) (S37).

Further, the CPU core 21 calculates the distance between the display coordinates of the control target object and the input coordinates (S39). If the distance is less than a predetermined value (i.e., "No" in step S40), the CPU core 21 ends the display-coordinate update process and proceeds to step S14 in FIG. 7. If the distance is grater than or equal to the predetermined value, the CPU core 21 performs an association display process (S41). The association display process is a process for displaying a straight line connecting between the control target object and the finger, such as that shown in FIG. 3. The association display process will be described in detail below with reference to FIG. 10.

Figure 10:
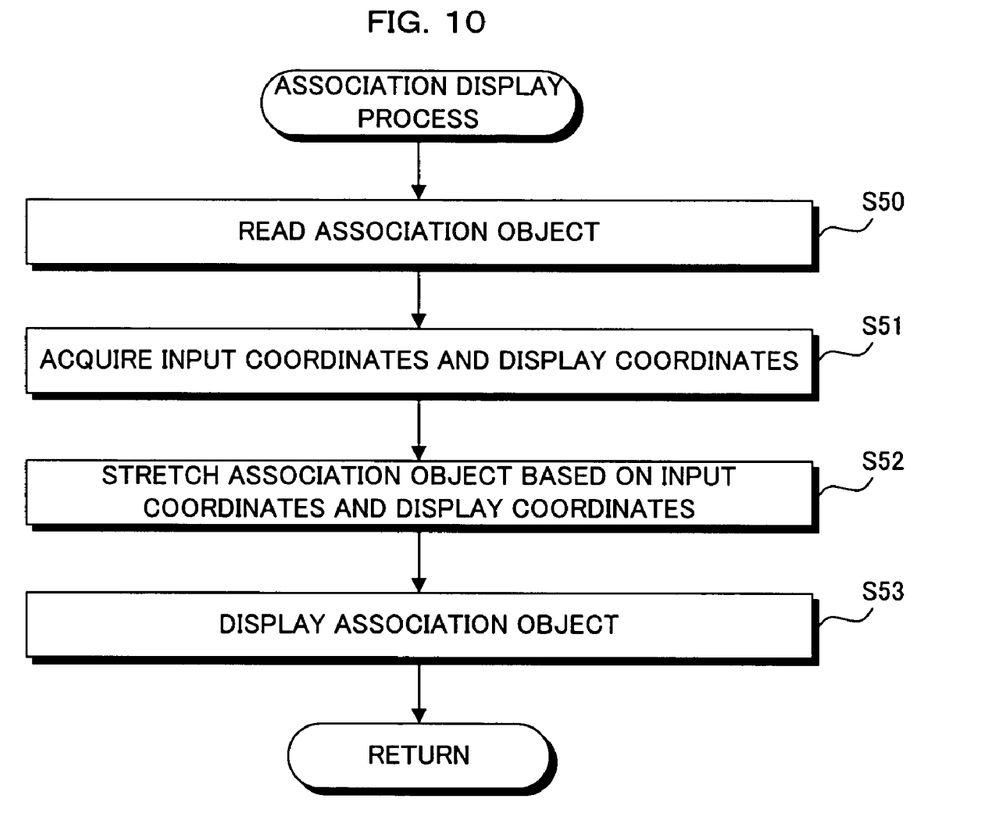
FIG. 10 is a flowchart showing the flow of an association display process.

In FIG. 10, the CPU core 21 reads an association object from the WRAM 22 (or the ROM 17a) (S50). The association object is an object from which the straight line shown in FIG. 3 originates. The CPU core 21 then acquires input coordinates and the display coordinates of the control target object from the WRAM 22 (S51), stretches the association object based on these coordinates (S52), and displays the association object such that both ends of the association object are located at the input coordinates and the display coordinates, respectively (S53). When the association display process is ended, the CPU core 21 also ends the display-coordinate update process in FIG. 9 and proceeds to step S14 in FIG. 7.

In FIG. 7, when the display-coordinate update process is ended, the CPU core 21 updates a game image displayed on the second display screen 12a (S14). The CPU core 21 then determines whether the game is over (S15), and if the game continues, the CPU core 21 returns to step S11. In this manner, the processes of steps S11 to S14 are repeated, for example, 60 cycles per second.

By the above-described processing, when the control target object has stopped by a collision with an obstacle, a straight line connecting between the finger and the control target object is displayed. Therefore, the player can be convinced that the cause that the position of the finger has deviated from the control target object does not result from touch panel failure or misoperation (specifically, the finger is removed from the touch panel), but results from normal processing based on the game program. Accordingly, the player can proceed with the game without having an unnecessary sense of uncertainty. Needless to say, even in the case where the obstacle is transparent and invisible, the same or even greater effect can be achieved.

In the present embodiment, a straight line connecting between the finger and the control target object is displayed only when the finger has deviated from the control target object, but not other times (i.e., when the control target object is moving without the finger removed therefrom). Therefore, as long as the finger does not deviate from the control target object, unnecessary information is not displayed in a game image, and thus the visibility of the game image is not impaired.

Note that although the present illustrative embodiment describes an example where the finger deviates from the control target object as the result of a collision of the control target object with an obstacle, even in the case where the finger deviates from the control target object due to other factors, if the factor results from normal processing based on the game program, the present invention is effective. As an example, there may be a case where an upper limit is set to the moving speed of the control target object. Specifically, instead of tentatively setting the display coordinates of the control target object to the input coordinates in step S34 in FIG. 9, the display coordinates of the control target object may be tentatively set to coordinates brought close to a given distance corresponding to the upper limit of the moving speed of the control target object in the direction of the input coordinates, and in step S38 the display coordinates of the control target object may be set to the tentatively set coordinates. In this case, if the moving speed of the finger is faster than the upper limit of the moving speed of the control target object, the finger deviates from the control target object; however, according to the present invention, the player can be convinced that the cause that the position of the finger has deviated from the control target object does not result from touch panel failure or misoperation (specifically, the finger is removed from the touch panel), but results from normal processing based on the game program. Accordingly, the player can proceed with the game without having an unnecessary sense of uncertainty. Note that the upper limit of the moving speed of the control target object may be changed according to the current position of the control target object. By changing the upper limit of the moving speed of the control target object according to the type of ground, a rendering which looks as if the frictional force generated between the ground and the control target object changed according to the type of the ground is made possible. In this case too, even if the speed of the control target object reduces and thereby the finger has deviated from the control target object, the player can be convinced that the cause that the position of the finger has deviated from the control target object does not result from touch panel failure or misoperation (specifically, the finger is removed from the touch panel), but results from normal processing based on the game program. Accordingly, the player can proceed with the game without having an unnecessary sense of uncertainty.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein a game program which allows a computer being electrically connected to a display screen for displaying a game image and a touch panel covering the display screen, to function as:
    game image display programmed logic circuitry configured to display on the display screen a game image including an object image movable by a player;
    input coordinate detecting programmed logic circuitry configured to detect, at a predetermined interval, input coordinates outputted from the touch panel when an input is applied to the touch panel by the player;
    control-target setting programmed logic circuitry configured to set, when the input coordinates at an initial stage of detection by the input coordinate detecting programmed logic circuitry and display coordinates of the object image on the display screen satisfy a certain relationship, the object image as a control target object of the player while input coordinates are continued to be detected from the touch panel by the input coordinate programmed logic circuitry;
    display-coordinate updating programmed logic circuitry configured to sequentially update the display coordinates of the control target object according to input coordinates sequentially detected by the input coordinate detecting programmed logic circuitry;
    determining programmed logic circuitry configured to determine whether or not, while the display coordinates of the control target object are being sequentially updated by the display-coordinate updating programmed logic circuitry, current input coordinates detected by the input coordinate detecting programmed logic circuitry and current display coordinates of the control target object have been spaced apart by a predetermined distance due to a factor that hinders movement of the control target object; and
    display state changing programmed logic circuitry configured to change, when a determination result provided by the determining programmed logic circuitry is positive, a display state of the game image so as to indicate that the control target object is set as a control target of the player.

2. The non-transitory computer-readable storage medium according to claim 1, wherein the game program further allows the computer to function as update stopping programmed logic circuitry configured to stop an update of the display coordinates of the control target object when the display coordinates of the control target object satisfy a predetermined condition.

3. The non-transitory computer-readable storage medium according to claim 1, wherein the display state changing programmed logic circuitry displays a line connecting between a position corresponding to the current input coordinates and the control target object.

4. The non-transitory computer-readable storage medium according to claim 1, wherein the display state changing programmed logic circuitry displays a predetermined image on a straight line connecting between a position corresponding to the current input coordinates and the control target object.

5. The non-transitory computer-readable storage medium according to claim 1, wherein the display state changing programmed logic circuitry changes a display mode of the control target object.

6. The non-transitory computer-readable storage medium according to claim 1, wherein the display state changing programmed logic circuitry changes a display state of the game image according to a distance between the current input coordinates and the display coordinates of the control target object.

7. The non-transitory computer-readable storage medium according to claim 1, wherein the factor that hinders the movement of the control target object includes an obstacle existing in a virtual space in which the control object moves.

8. The non-transitory computer-readable storage medium according to claim 1, wherein the factor that hinders the movement of the control target object includes an upper limit set for a moving speed of the control target object.

9. The non-transitory computer-readable storage medium according to claim 1, wherein the factor that hinders the movement of the control target object includes a frictional force that occurs between the control target object and a virtual ground on which the control target object is placed.

10. A game system electrically connected to a display screen for displaying a game image and a touch panel covering the display screen, the game system being configured to execute a game program causing a processor of the game system to function as:

game image display programmed logic circuitry configured to display on the display screen a game image including an object image movable by a player;

input coordinate detecting programmed logic circuitry configured to detect, at a predetermined interval, input coordinates outputted from the touch panel when an input is applied to the touch panel by the player;

control-target setting programmed logic circuitry configured to set, when the input coordinates at an initial stage of detection by the input coordinate detecting programmed logic circuitry and display coordinates of the object image on the display screen satisfy a certain relationship, the object image as a control target object of the player while input coordinates are continued to be detected from the touch panel by the input coordinate programmed logic circuitry;

display-coordinate updating programmed logic circuitry configured to sequentially update the display coordinates of the control target object according to input coordinates sequentially detected by the input coordinate detecting programmed logic circuitry;

determining programmed logic circuitry configured to determine whether or not, while the display coordinates of the control target object are being sequentially updated by the display-coordinate updating programmed logic circuitry, current input coordinates detected by the input coordinate detecting programmed logic circuitry and current display coordinates of the control target object have been spaced apart by a predetermined distance due to a factor that hinders movement of the control target object; and display state changing programmed logic circuitry configured to change, when a determination result provided by the determining programmed logic circuitry is positive, a display state of the game image so as to indicate that the control target object is set as a control target of the player.

11. The system according to claim 10, wherein the game program further allows the processor to function as update stopping programmed logic circuitry configured to stop an update of the display coordinates of the control target object when the display coordinates of the control target object satisfy a predetermined condition.

12. The system according to claim 10, wherein the display state changing programmed logic circuitry displays a line connecting between a position corresponding to the current input coordinates and the control target object.

13. The system according to claim 10, wherein the display state changing programmed logic circuitry displays a predetermined image on a straight line connecting between a position corresponding to the current input coordinates and the control target object.

14. The system according to claim 10, wherein the display state changing programmed logic circuitry changes a display mode of the control target object.

15. The system according to claim 10, wherein the display state changing programmed logic circuitry changes a display state of the game image according to a distance between the current input coordinates and the display coordinates of the control target object.

16. The system according to claim 10, wherein the factor that hinders the movement of the control target object includes an obstacle existing in a virtual space in which the control object moves.

17. The system according to claim 10, wherein the factor that hinders the movement of the control target object includes an upper limit set for a moving speed of the control target object.

18. The system according to claim 10, wherein the factor that hinders the movement of the control target object includes a frictional force that occurs between the control target object and a virtual ground on which the control target object is placed.

19. A method for execution on a game system comprising a processor and being electrically connected to a display screen for displaying a game image and a touch panel covering the display screen, the method comprising:

displaying on the display screen a game image including an object image movable by a player;

detecting, at a predetermined interval, input coordinates outputted from the touch panel when an input is applied to the touch panel by the player;

setting, when the input coordinates at an initial stage of detection by said detecting and display coordinates of the object image on the display screen satisfy a certain relationship, the object image as a control target object of the player while input coordinates are continued to be detected from the touch panel by the detecting;

sequentially updating the display coordinates of the control target object according to input coordinates sequentially detected by the detecting;

determining whether or not, while the display coordinates of the control target object are being sequentially updated, current input coordinates detected by the detecting and current display coordinates of the control target object have been spaced apart by a predetermined distance due to a factor that hinders movement of the control target object; and changing, when a determination result provided by the determining programmed logic circuitry is positive, a display state of the game image so as to indicate that the control target object is set as a control target of the player.

20. The method according to claim 19, further comprising stop an update of the display coordinates of the control target object when the display coordinates of the control target object satisfy a predetermined condition.

21. The method according to claim 19, wherein the changing displays a line connecting between a position corresponding to the current input coordinates and the control target object.

22. The method according to claim 19, wherein the changing displays a predetermined image on a straight line connecting between a position corresponding to the current input coordinates and the control target object.

23. The method according to claim 19, wherein the changing changes a display mode of the control target object.

24. The method according to claim 19, wherein the changing changes a display state of the game image according to a distance between the current input coordinates and the display coordinates of the control target object.

25. The method according to claim 19, wherein the factor that hinders the movement of the control target object includes an obstacle existing in a virtual space in which the control object moves.

26. The method according to claim 19, wherein the factor that hinders the movement of the control target object includes an upper limit set for a moving speed of the control target object.

27. The method according to claim 19, wherein the factor that hinders the movement of the control target object includes a frictional force that occurs between the control target object and a virtual ground on which the control target object is placed.

* * * * *